United States Patent [19]

Dawson

[11] 4,306,854
[45] Dec. 22, 1981

[54] FLUID BED FURNACES

[75] Inventor: Harry Dawson, Rochdale, England

[73] Assignee: G. P. Worsley and Company Limited, England

[21] Appl. No.: 27,586

[22] Filed: Apr. 6, 1979

[30] Foreign Application Priority Data

Apr. 8, 1978 [GB] United Kingdom ............... 13886/78

[51] Int. Cl.³ ............................................ F23D 19/00
[52] U.S. Cl. ...................................... 431/170; 431/7; 432/58; 110/245
[58] Field of Search ............... 110/245, 263, 265, 347; 431/7, 170, 328; 432/15, 58

[56] References Cited

U.S. PATENT DOCUMENTS

| | | | |
|---|---|---|---|
| 3,769,922 | 11/1973 | Furlong et al. | 110/263 |
| 3,881,857 | 5/1975 | Hoy et al. | 431/7 |
| 3,921,590 | 11/1975 | Mitchell et al. | 110/245 X |
| 3,975,148 | 8/1976 | Fukuda et al. | 432/58 X |
| 4,021,184 | 5/1977 | Priestly | 431/7 |
| 4,052,140 | 10/1977 | Highley | 431/7 |

FOREIGN PATENT DOCUMENTS 2618290 12/1976 Fed. Rep. of Germany ...... 110/245

1475992 6/1977 United Kingdom ............... 110/245

*Primary Examiner*—Robert S. Ward, Jr.
*Attorney, Agent, or Firm*—William A. Drucker

[57] ABSTRACT

A fluid-bed furnace has at least one combustion chamber, preferably two side-by-side, housing a bed of incombustible particulate material to be fluidized when burning fuel fed thereto. Bed fluidization is by forced release in the incombustible material of combustion promoting gas, normally air, from a plenum chamber arrangement externally of the bed proper at a side or end thereof to save overall height. Other features include the return of used exhaust gas to the bed for additional fluidizing and heating purposes; release within the bed of such returned exhaust gas at a position higher than normal combustion promoting gas; an auxiliary burner within the combustion chamber to consume fine fuel material lifted from the bed in operation; insulation of at least the normal combustion promoting gas plenum chamber externally by incombustible bed material and/or internally by refractory lining; end tapering of bed traversing gas feed pipes to reduce expansion resistance; and a removable end plug in the latter pipes to ease cleaning thereof.

26 Claims, 9 Drawing Figures

—FIG.3—

FLUID BED FURNACES

The invention relates to fluid-bed furnaces wherein at least an upper part of a bed of incombustible particulate material, for example sand, is "fluidised", that is maintained in motion, by a combustion promoting gas, such as air, supplied thereto under pressure for the burning of fuel material added to the fluidised materials, usually in solid form, e.g. coal, but possibly in liquid form, e.g. oil.

Our experience in developing and building furnaces of this type has led us to an appreciation of certain improvements that are now made the subject of this application. For example, placement of plenum arrangements below the bed, even incorporating them as relatively large size sparge pipes, is at least superficially attractive in minimising the extent, spacing, and overall size of the distribution system or systems. However, the use of stand-pipe type release piping or ducting may then lead to such an overall height of distribution system as to require a significant increase in the base height requirements and thus the total height of the overall furnace. We therefore propose that both the plenum chamber and its preferred accommodation of an auxiliary heater be provided at a side or end of the remainder of the distribution system which may then have sparge or distribution pipes of much reduced cross-section or diameter as consistent only with desired gas flow therethrough to the bed. Then, a combined ignition heating, gas supply system and furnace bed retaining chamber structure will have a comparatively low overall height and may conveniently be fabricated in a factory or works and delivered to site for building up of the remaining refractory clad furnace structure.

Such a gas distribution system also particularly facilitates removal, replacing and servicing of the plenum chamber, and also removal of individual sparge or distribution pipes extending therefrom. An overlapped or telescopic coupling may be provided between stub connectors of the plenum chamber and end portions of the sparge pipes. However, an alternative and perhaps simpler intercoupling comprises butting flanges on stub connectors and the sparge pipes. The latter has particular advantages by way of simplifying construction when used in conjunction with another proposal hereof, which concerns problems that can arise from expansion of the plenum chamber, usually comprised of stainless steel, particularly in relation to close location of its stub connections in and through refractory furnace walling to provide retention of incombustible particulate bed material. Thus, we now propose that the stub connections be a substantial clearance fit through furnace walling about the bed material. Then sliding plate type seals about the stub connections and/or the sparge pipe end portions either on the bed material side of the walling and retained in position by the weight of the bed material or on the plenum chamber side of the walling and retained by pressure, bias or simple securement to the walling where, as is preferred, the other ends of the sparge pipes are free to move in accommodating expansion.

If desired, however the last mentioned seals may be omitted altogether and the bed material allowed to fill a housing for the plenum chamber outside the furnace walling. Such an arrangement actually affords an advantage in that heat losses are reduced from the plenum chamber during operation of its auxiliary burner, as the bed material, such as sand, will normally be a good insulator. This latter advantage may, however, alternatively be obtained, or additionally enhanced, by lining the interior of the plenum chamber with refractory material, preferably of a castable type, which also brings with it the further advantage of reducing heat expansion of the plenum chamber itself.

Concerning ends of the in-bed sparge or distribution pipes that are distal from the plenum chamber, we prefer that they be tapered to minimise resistance to their expansion from the bed material. At least then, removable plugs in those ends will facilitate clearing the sparge pipes of any particulate material that gets into them, usually using a blast of pressurised gas from the plenum chamber but possibly by suction from the plug holes.

Also, it has been normal practice for combustion promoting gas to be fed into the bed and the exhaust gas products of burning in the bed to be released into material to be dried, such as grass or other crops, clay or other materials, and then released to atmosphere, often still at an elevated temperature, at least compared to ambient air used as the combustion promoting gas. One particular proposal herein is therefore to return this used exhaust gas to the bed, especially as its possibly low combustion promoting content at exhaust will usually have been increased during its use as that is not normally in a previously evacuated vessel or apparatus. Normally, however, such returned gas will have a substantial moisture content and would result in condensation if mixed directly into the normal gas supply to the bed in a manner similar to what has sometimes been previously proposed for other types of furnace. This would particularly be disadvantageous for fluid-bed furnaces, as the combustion promoting gas distribution system to the bed, for example distribution or so-called sparge pipes traversing the bed, would then be liable to severe corrosion, perhaps accentuated in the presence of contaminants additional to water. We therefore propose that separated systems be provided for returned or recycled gas and normal or primary gas supply, say via separate plenum chambers and distribution pipes or ducts and/or stand pipes into the bed proper.

One further potential problem arises from the likely presence of entrained solid material in the returned or recycled gas and the consequent probability of blocking the bed distribution system. One measure mitigating this problem is to arrange that release positions for recycled gas into the bed are at least slightly higher than release positions for the other gas. Then, as fluidising will commence at the level of the lower release positions, there will be substantial heat (from fuel burning in the bed) at the upper release positions so as to burn off any entrained material collecting there. Another measure is to arrange that the recycled gas is returned via an auxiliary burner chamber used in preheating combustion promoting gas at least, and usually only on furnace light-up in raising the temperature of the incombustible bed material to ignition temperature for the fuel, which will usually be added later but may be present at that time, at least for a furnace already commissioned and in use. It is particularly convenient to mount such an auxiliary burner directly into a plenum chamber for the recycled gas.

Another problem that may arise from the presence of fuel material in the bed at ignition time is that of a decomposition or blowing-off of lighter parts of that fuel material during heat-up and prior to ignition temperature being reached, which can result in the formation of an explosive mixture above the bed material. We therefore propose that, in addition to an auxiliary burner as above mentioned or for other combustion gas supply if gas recycling is not used, a further burner be provided that is operative wholly above the bed material and preferably plays a flame downwardly thereon and across. This effectively combines two of our previous types of proposal for ignition and significantly speeds bed heating. Also, we prefer that the further burner be of high heat output so as to be capable of serving as a back-up or alternative heating system not requiring bed fuel burning, though the possibility of using both systems simultaneously is not discounted if particularly high heating requirements are made of the furnace.

Whatever the system or systems of gas distribution, whether by so-called sparge pipes traversing the bed or through a bed support or via an arched or domed structure within the bed material, it is preferred that standpipes or take-off pipes or tubes be used terminating in gas delivery positions or heads substantially above the remainder of the distribution system or systems. This will allow the latter to be within substantially static and thus relatively cold lower layers of the bed material even on fluidising thereof, and avoid the problems that can arise on furnace shut-down when the fluidised material "slumps" from a considerably greater overall depth and may contact upper parts of direct top-or side-exit distribution pipes or chambers with the consequent serious risk that the very high temperature then produced locally will damage or even distort those pipes or chambers by crystallisation effects similar to fatigue or by rapid and differential partial expansion. Such an arrangement is, of course, especially well suited to the proposal to release recycled and other gas at different levels.

Wherever it is desired to maximise fuel consumption, and thus usuable heat output, of a fluid bed furnace, the practical limits placed upon gas through-out and, particularly, bed temperature to avoid fusing, which also limit heat output and fuel consumption, we propose that coolant fluid distribution means be provided within the bed depth as expanded by fluidisation but above the level to which the bed material will slump, thus avoiding the distortion and other differential effects that could otherwise occur in a manner analogous to that referred to above for the distribution system. The coolant fluid will, of course, be heated in the bed and may be used directly or indirectly for another or related purpose, but, where that fluid is a combustion promoting gas or perhaps even an acceptable additive or diluent therefor, it may be mixed with at least normal combustion promoting gas supply or even recycled gas supply given compatible temperatures as regards avoiding condensation. Then, of course, any deficiencies of combustion gas components could be further remedied.

It will normally be the case that a container for the bed material will also incorporate ash removal and/or sand recycling means, say in the form of screw or auger type conveyors with, if required, screening and a return conveyor to the furnace chamber or fuel feed therefor. A similar or other, say pneumatic, ash and incombustibles removal system may be provided in an exhaust chamber separate or partitioned from the furnace chamber proper.

Obviously, fuel feed arrangements to the furnace chamber require to be sealed therefrom and, for solid fuels, we have previously proposed a rotary feeder. However, that tends to discharge fuel in successive discrete quantities, whereas, in the interest of greatest efficiency, a fluid bed furnace should benefit from a continuous feed, perhaps preferably interlocked and controlled as to its rate of feed by the bed temperature. We believe that a screw type feed should be satisfactory and such, if with multistart blading, will have each blade maintain a seal to a tube or bore within which it is operative and be of such extent and spacing from adjacent blades as to cooperate with the fed fuel in precluding through passage of gas. A nonsealing such feed could, of course, be used after a rotary sealed feed, as indeed could vibratory or paddle type feeds.

Practical implementation of the invention will now be described by way of example, with reference to the accompanying diagrammatic drawings, in which.

Figure 1:
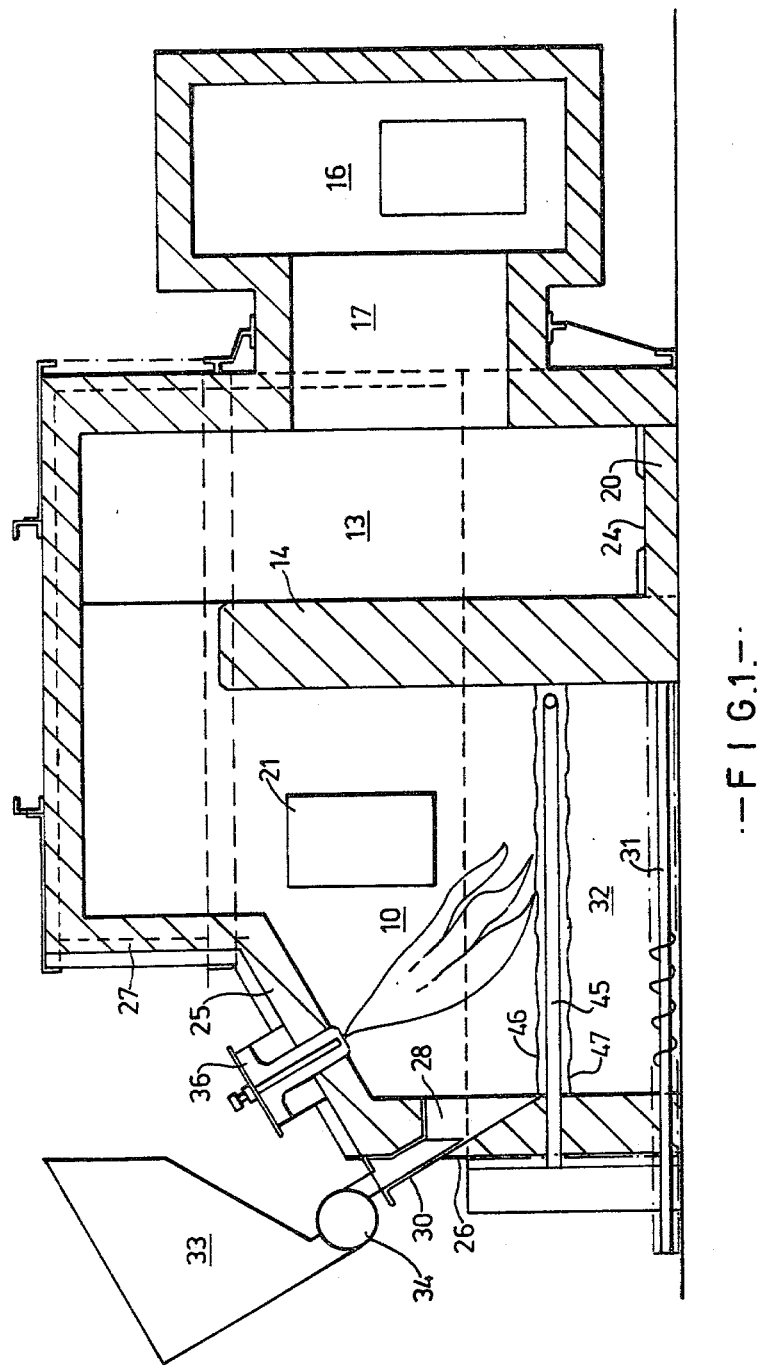
FIG. 1 is a part-sectional side view of one embodiment.
Figure 2:
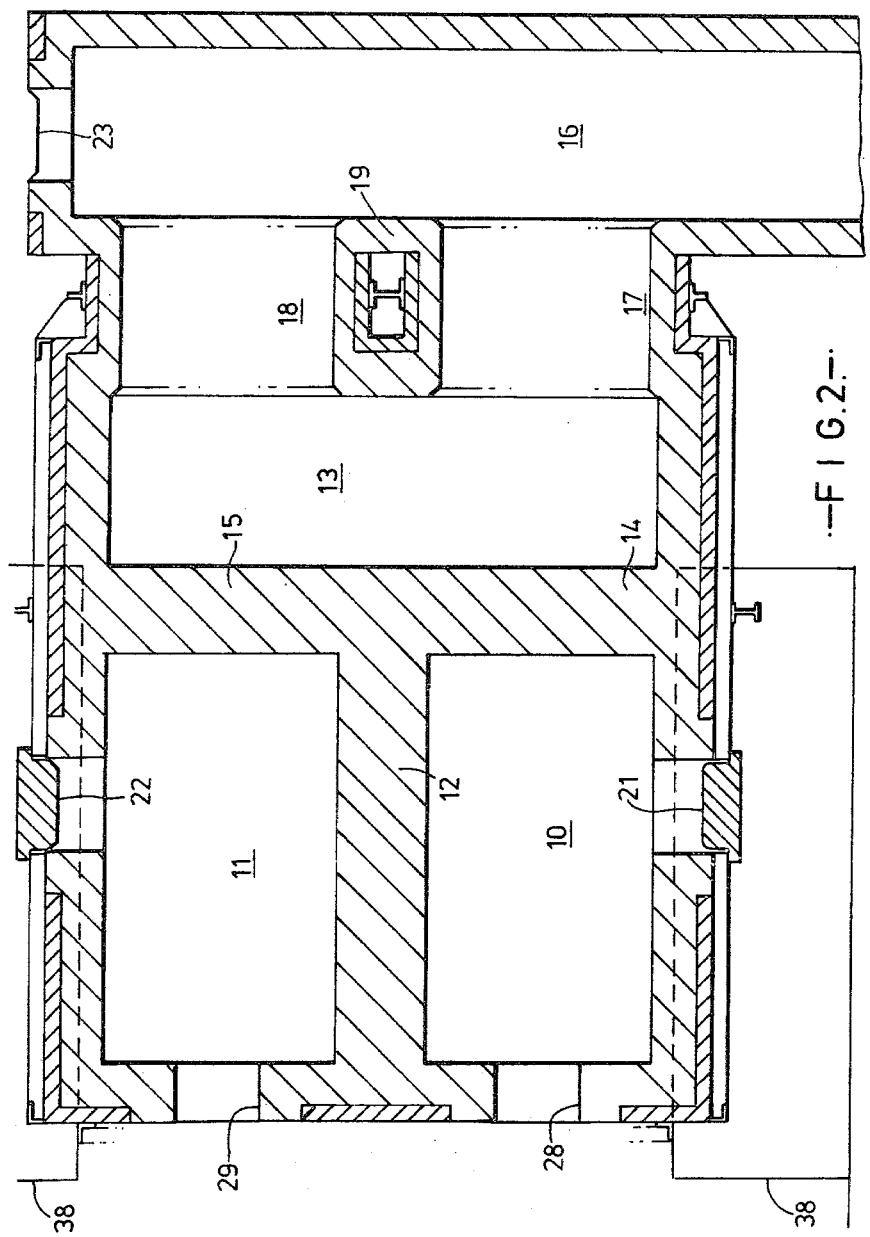
FIG. 2 is a part-sectional plan view of the embodiment of FIG. 1.
Figure 3:
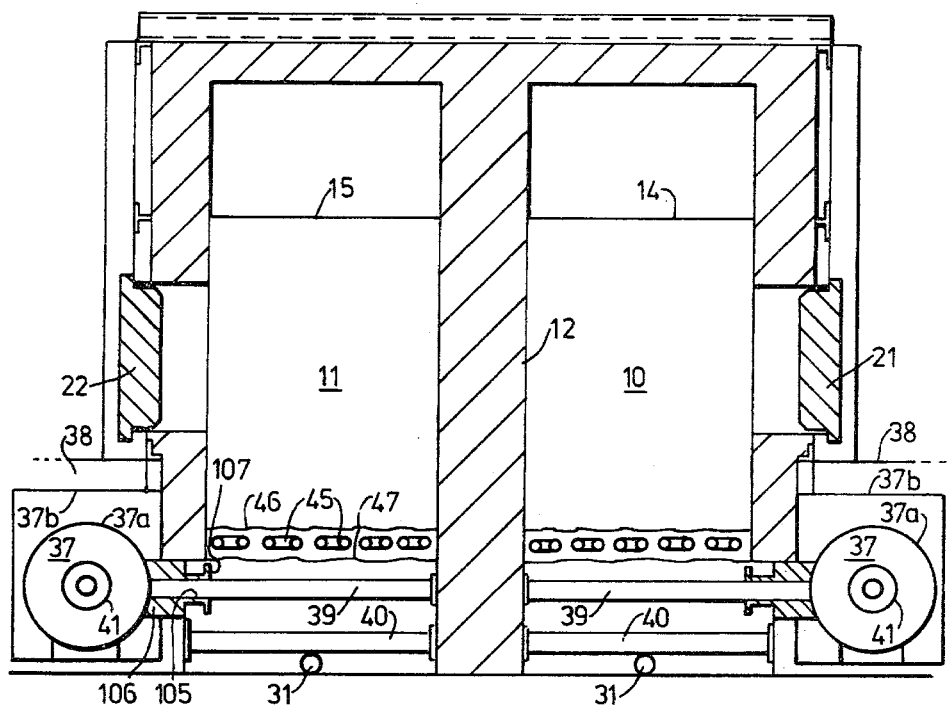
FIG. 3 is a part-sectional end view of the embodiment of FIG. 1.

Referring first to FIGS. 1 to 3, a dual bed furnace has a refractory lined structure defining side-by-side bed chambers 10, 11 separated from each other by partition 12, a common exhaust gas chamber 13 to which the bed chambers have access over walling 14, 15, and a common exhaust flue 16 having access 17, 18 to the chamber 13 to each side of divider 19 at a level below the top of walling 14, 15 but above a grit/ash collection base 20 of the chamber 13. Access doors 21, 22, 23 are shown to the bed chambers 10, 11 and the flue 16 for maintenance and cleaning purposes. A further access door (or doors) may be provided to the chamber 13. A conveyor is indicated at 24 for debris removal from chamber 13, and a pneumatic type could be used. Ash removal, screening and sand recycling is indicated generally at 31.

The height of the bed chamber walling 14, 15 maximises ash and grit drop-back into the beds themselves and the lower height of the fluid access 17, 18 promotes further drop out in the chamber 13.

At their other ends the furnace chambers 10, 11 have a reduced height by reason of end walling having a sloping step 25 between lower and upper parts 26, 27. The lower end wall parts 26 are apertured at 28, 29 for sloping coal feeds 30 into or onto particulate material 32 of which the bed is composed and which is to be fluidised above a predetermined depth. Coal feeds 30 are sealed from supply hoppers 33 by rotary feeds 34. Mounted in the steps 25 are auxiliary and preheating gas or oil burners 36 for directing their flames onto and along the bed material 32.

Fluidising combustion promoting gas, normally air, is supplied to the particulate bed material 32, normally sand, via either or both of plenum chambers 37, 38 that are shown one within the other at each side of the dual bed furnace and feed the beds via distribution pipe sets 39, 40, respectively. In this embodiment, the pipe set 39 from plenum chamber 37 is above the pipe set 40 in the bed. The chamber 37 is intended for enriching of exhaust gases returned after use, say in a crop drier, and supplied directly within an inner chamber wall 37a serving as a manifold for pipe set 39 and also housing a preheating burner 41. Air, or other perhaps richer gas, can be inducted within the chamber wall 37b and through perforations in chamber wall 37a, or vice versa. Either way, maximum use is made of any heat left in recycled gas, directly in the bed and in heating air in the chamber 38.

In practice, of the order of 50% or more of combustion promoting gas will be provided by a fan or fans feeding the chamber 38 and the bed will be fluidised from the in-bed gas release level of the pipe set 40, which can if desired, be made to be above the actual physical position of pipe set 39 by the use of sand pipes from the set 40 and, preferably, from the set 39, as will be described for FIGS. 4 to 8. However actual bed release is done, the pipe set 39 will be below the slump level of the bed material.

U-shaped coolant cycling tubes 45 are indicated in outline at a position between maximum bed material height 46 on fluidisation and minimum bed material height 47 under slump conditions.

Figure 4:
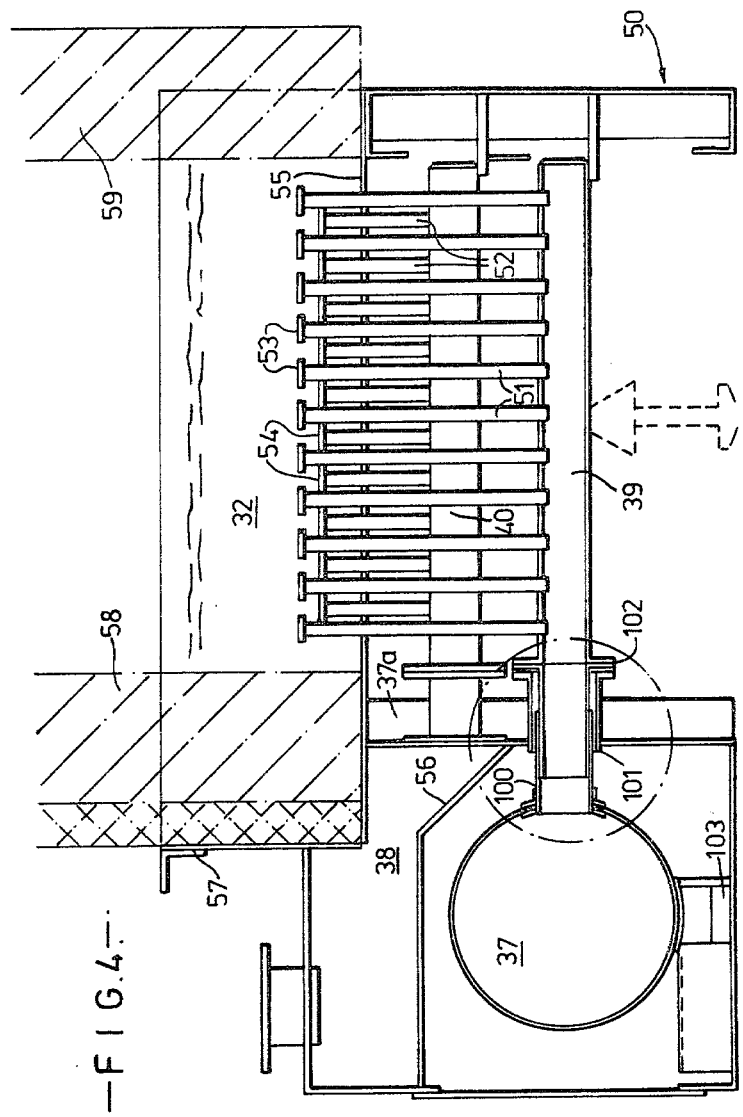
FIG. 4 is a part-sectional side-view of the base of another embodiment.
Figure 5:
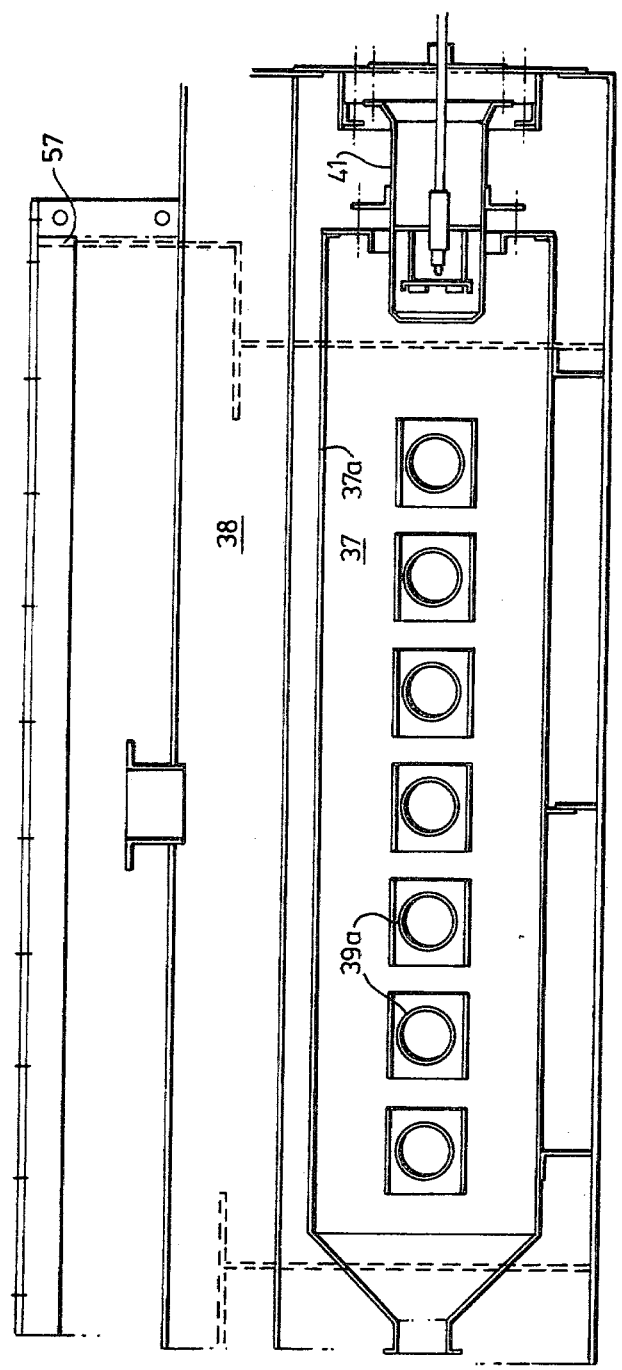
FIG. 5 is a part-sectional view at right angles to that of FIG. 4.
Figure 6:
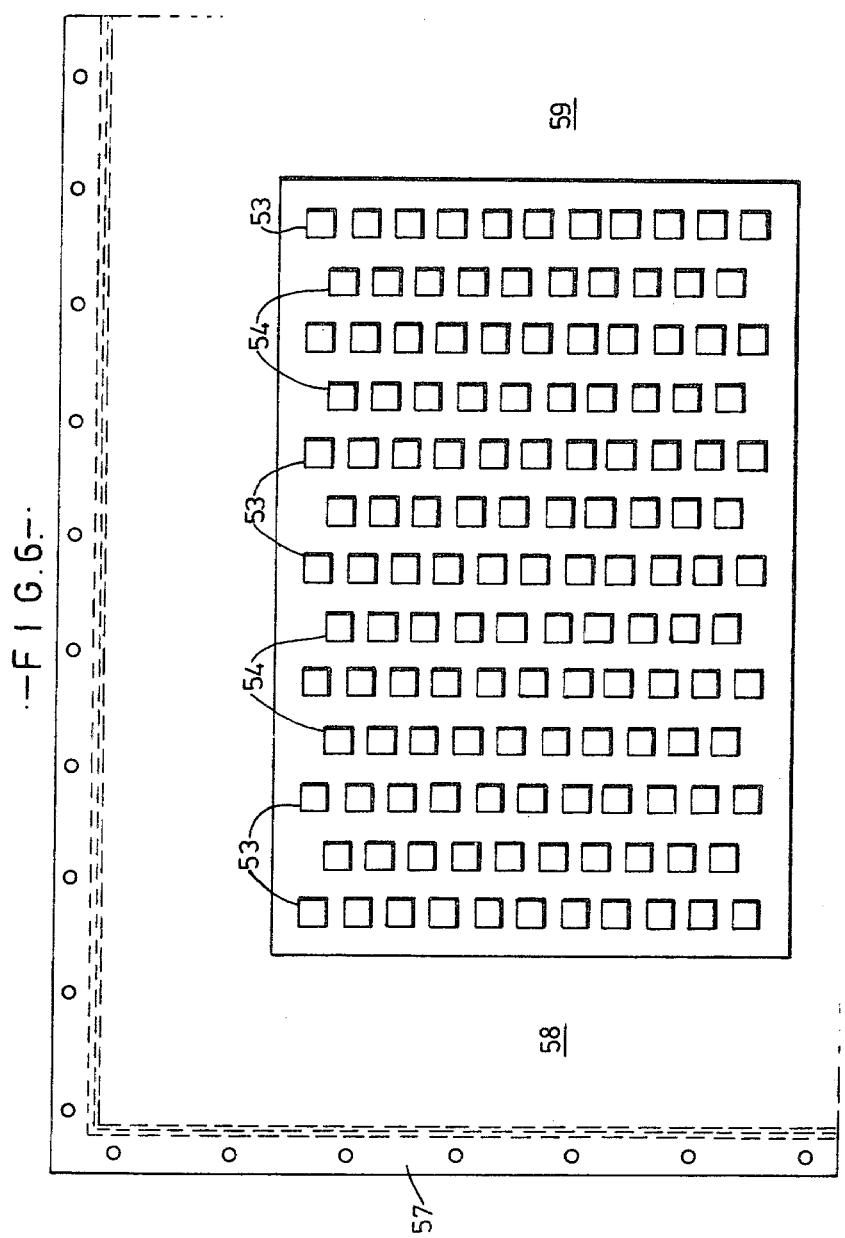
FIG. 6 is a partial plan view of what is shown in FIG. 4.

Turning to FIGS. 4 to 6 the overall furnace arrangement is generally similar, but the entire furnace bed support and air distribution system can be made and supplied to site for building up of refractories on top of it. Thus a fabricated open bottom and apertured top steel structure 50 houses, in a readily removable manner, pipe sets 39 and 40 for recycled and/or preheated gas, and other gas, respectively, but this time reversed in levels and having gas release stand pipes 51, 52 to outlet heads 53, 54 with those 53 for the pipe set 39 above those 54 for the pipe set 50 to ensure fluidising below the heads 54 and thus reduce the likelihood of their blockage by any entrainments in recycled gas. The stand pipes 51, 52 are shown passing through apertures in apertured top 55 of steel structure 50, serving as a support for particulate bed material 32, though, if desired, that top could be omitted altogether and the whole structure 50 filled if it will sealingly contain the bed material. The latter possibility could facilitate fitting of ash/sand removal means, preferably of a screening and recycling type, say adding fines to the fuel input. In either case, the slump level for bed material is above the stand-pipe heads 54 to avoid the problems mentioned above.

The plenum chamber arrangement is modified compared with FIG. 3 in having a simple angled partition 56 between the chambers 37 and 38, and the manifold function of the inner chamber wall 37a is shown clearly by jointing stubs 100 in FIG. 5. An upstand 57 of the steel structure serves to assist in locating refractories 58 when building up the furnace proper, and a ledge at the other side seats refractory 59 of a dual furnace dividing partition.

Figure 7:
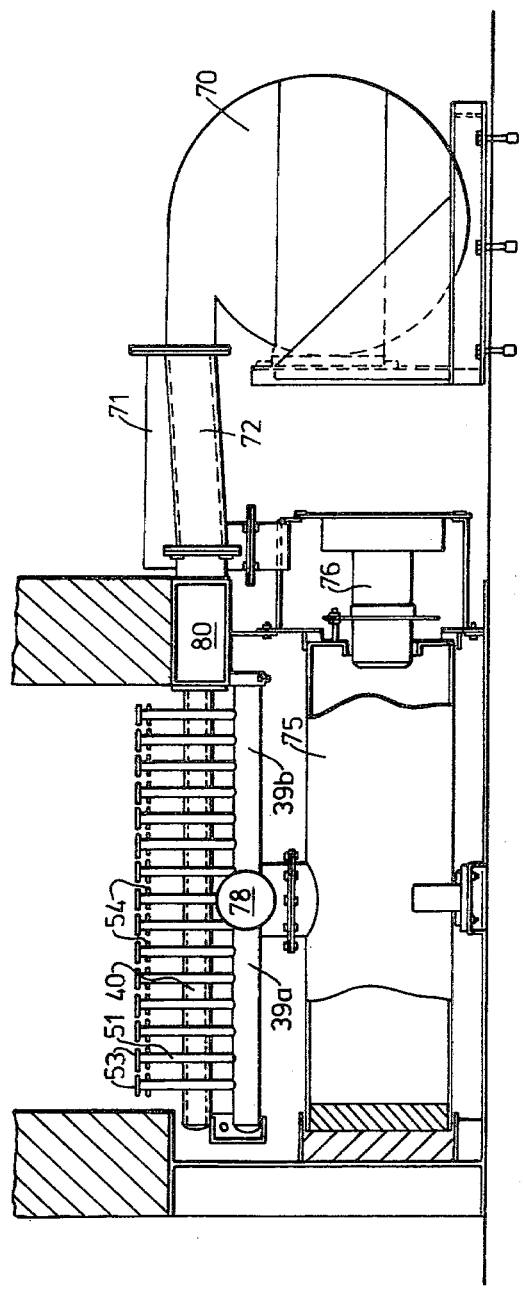
FIG. 7 is a part-sectional side view of a further embodiment.
Figure 8:
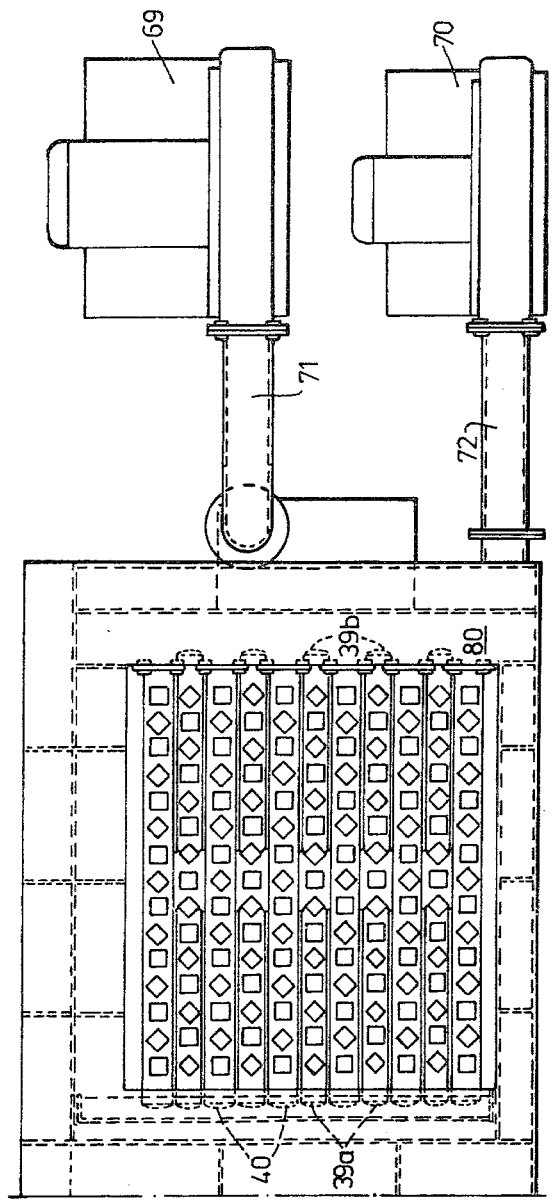
FIG. 8 is a plan-view of what is shown in FIG. 7.

Turning to FIGS. 7 and 8, separate blower fans 69 and 70 are shown for recycled and unrecycled gas, respectively, via ducting 71, 72, respectively. Again, in this embodiment a factory made base unit 73 is shown, but this time incorporating beneath the bed a preheating and distributing plenum chamber 75 having a burner mount 76 and upper connections 77 central to by pipe 78 teed to distribution pipes 39a and 39b fitted with stand-pipes 51 and release head 53 in the bed material. These heads 53 are again above the level of heads 54, from distribution pipes 40 fed from a plenum chamber 80 connected to ducting 72.

The jointing stubs 100 of FIG. 5 are shown closely fitting over ends of the sparge pipes 39 and themselves clearance fitted within couplers 101 secured to the sparge pipes by flanging indicated generally at 102 and themselves a close fit to holes in the furnace walling 37a. At least one component of the flanging 102, usually that on the sparge pipes, will normally have expansion tolerance cuts straddling securing bolt positions. That and the clearance of the couplers 101 over the stubs 100 permits tolerance of expansion of the plenum chamber 37, usually of stainless steel, and that expansion is distributed by anchoring at 103 substantially centrally of its lengths. Further tolerance of expansion of the sparge pipes themselves is afforded by sliding of the couplers 101 and the ends of those sparge pipes relative to the stubs 100 through the furnace walling. This arrangement contrasts with the simple slide interfit in FIG. 3 of the sparge pipes on entries 105 of sand retainer sleeves or boxes 106, with or without a sliding seal 107, but does ensure sand retention within the furnace proper and avoids close location of the sleeves or boxes 106 in the furnace walling which can require careful packing to avoid damage on expansion of the plenum chamber during operation of its auxiliary burner. Also, central location of the sparge pipes to minimise drag on their upward distribution pipes is facilitated.

Figure 9:
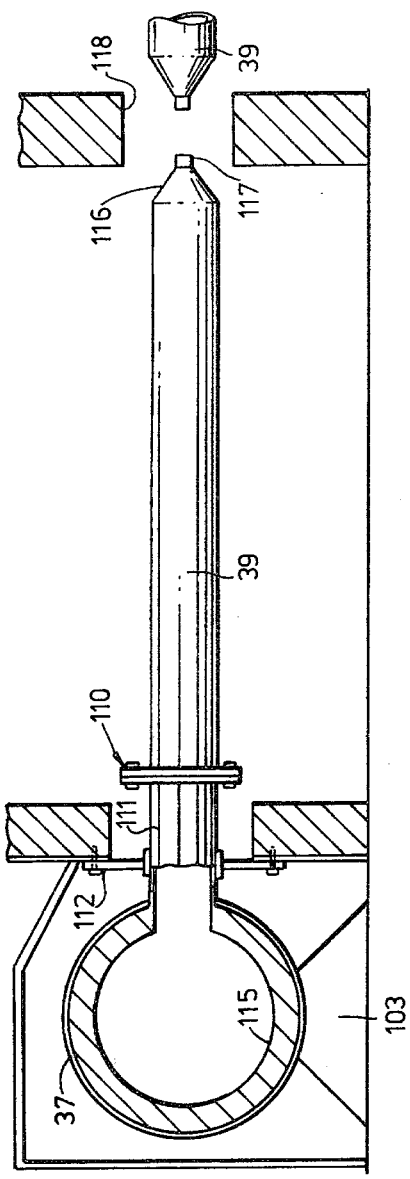
FIG. 9 shows part of modified combustion promoting gas distribution arrangement.

FIG. 9 shows modifications by which simple flange interconnections 110 are made between ends of the stubs 111 and the sparge pipes. A slide seal 112 is shown to the stubs 111 on the plenum chamber side of the furnace walling and secured to that walling. However, such seals may be omitted and the housing of the plenum chamber 37 allowed to fill up with sand or other incombustible particulate material if desired. The plenum chamber 37 is shown lined with cast refractory material 115 to reduce expansion of that chamber during operation of the auxiliary burner within it.

FIG. 9 also shows other preferred modifications, specifically the tapering of free ends 116 of the sparge pipes 39, which reduces resistance to their expansion through the sand or other incombustible particulate material of the bed. A removable plug 117 is shown in that tapered end so that, during maintenance of the furnace, any sand that has entered the sparge pipes via their upper distribution pipes (not shown) can be blown out. Access holes 118 in the furnace walling, shown as being between adjacent furnace chambers, facilitate this and permit expansion. Obviously, if the furnace has only a single chamber, the holes 118 will be blanked off in operation but could actually permit withdrawal of sparge pipes therethrough if desired.

It is also to be understood that the above indicated provision of individual slot-in types of upward distribution pipes could, if desired, be replaced by said pipes simply welded into the sparge pipes, possibly divergently in the length or about the circumference of each sparge pipe, perhaps especially when used without a return exhaust gas provision.

I claim:

1. A fluid bed furnace comprising at least one combustion chamber housing a bed of incombustible particulate material within which fuel is to be burned when the bed material is fluidised, means for fluidising that bed material by distributing pressurised combustion-promoting gas at least to an upper part of the bed material, and means also for returning some of the furnace exhaust gases under pressure to fluidice the bed material, the return means including a gas distribution system to said bed material which is separate from that for the combustion-promoting gas.

2. A fluid bed furnace, according to claim 1, wherein each gas distribution system comprises at least one plurality of gas outlets from at least one duct traversing the bed.

3. A fluid bed-furnace comprising at least one combustion chamber housing a bed of incombustible particulate material within which fuel is to be burned when the bed material is fluidised, means for fluidising that bed material by distributing pressurised combustion-promoting gas at least to an upper part of the bed material, and means also for returning some of the furnace exhaust gases under pressure to the bed material, the return means including a gas distribution system to said bed material which is separate from that for the combustion-promoting gas, wherein each gas distribution system comprises at least one plurality of gas outlets from at least one duct traversing the bed, wherein the outlets for exhaust gas are at higher levels than at least adjacent ones of the outlets for combustion-promoting gas.

4. A fluidized bed furnace comprising at least one combustion chamber housing a bed of incombustible particulate material within which fuel is to be burned when the bed material is fluidised, means for fluidising that bed material by distributing pressurised combustion-promoting gas at least to an upper part of the bed material, and means also for returning some of the furnace exhaust gases under pressure to the bed material, the return means including a gas distribution system to said bed material which is separate from that for the combustion-promoting gas, wherein each gas distribution system comprises at least one plurality of gas outlets from at least one duct traversing the bed, wherein the or each plurality of gas outlets are take-off pipes extending upwardly from their supply duct by an extent that ensures that the supply ducts are below the fluidised part of the bed material.

5. A fluidized bed furnace comprising at least one combustion chamber housing a bed of incombustible particulate material within which fuel is to be burned when the bed material is fluidised, means for fluidising that bed material by distributing pressurised combustion-promoting gas at least to an upper part of the bed material, and means also for returning some of the furnace exhaust gases under pressure to the bed material, the return means including a gas distribution system to said bed material which is separate from that for the combustion-promoting gas, wherein the means for fluidising using combustion-promoting gas includes a plenum chamber to feed in-bed distribution means, and wherein said plenum chamber also houses the auxiliary burner for heating such gas and thus the bed material to ignition temperature of the fuel material.

6. A fluid bed furnace, according to claim 5, comprising means operable at least during operation of the auxiliary burner for passing at least some of said returned exhaust gas via said plenum chamber.

7. A fluid bed furnace, according to claim 5, further comprising, in the or each said combustion chamber, an above-bed auxiliary burner operable during burning of fuel in the bed to consume combustible fuel components that rise from the bed.

8. A fluid bed furnace, according to claim 7, wherein the above-bed auxiliary burner is operative to play a flame downwardly onto and across the bed material.

9. A fluid bed furnace, according to claim 7, wherein the above-bed auxiliary burner is alone capable of satisfying a substantial heat output requirement with the bed fluidised but not burning fuel material.

10. A fluid bed furnace, according to claim 1, further comprising a coolant fluid distribution system located to be within the bed depth when expanded by fluidisation but above the bed depth when not fluidised.

11. A fluid bed furnace, according to claim 10, wherein heating of the coolant fluid is utilised as an auxiliary heat take-off from the furnace.

12. A fluid bed furnace, according to claim 11, wherein said coolant fluid is gaseous and is admixed with bed fluidising gas.

13. A fluid bed furnace, according to claim 12, further comprising means operative below the fluidised part of the bed material to remove such material from the bed together with coarse or agglomerated waste material.

14. A fluid bed furnace, according to claim 1, wherein a or said plenum chamber of the means for fluidising is disposed outside a side or end of the or each combustion chamber proper.

15. A fluid bed furnace, according to claim 14, wherein a or said plurality of in-bed gas feeding ducts connected to the or each said plenum chamber form therewith gas feeds passing through bed material retaining walling of the or each combustion chamber.

16. A fluid bed furnace, according to claim 15, wherein the or each said plenum chamber is elongate and connected to a row of said gas feeding ducts each anchored substantially centrally of its length.

17. A fluid bed furnace, according to claim 16, wherein the or each said plenum chamber is elongate and anchored substantially centrally of its length.

18. A fluid bed furnace, according to claim 17, wherein each said gas feeding duct has a relative movement permitting coupling it with its associated plenum chamber.

19. A fluid bed furnace, according to claim 18, wherein said coupling includes telescoping of ends of said gas feeding ducts in corresponding stub connections of its associated plenum chamber.

20. A fluid bed furnace, according to claim 15, wherein each said gas feed is sealed to said walling.

21. A fluid bed furnace, according to claim 15, wherein each said gas feed is a clearance through a hole in said walling.

22. A fluid bed furnace, according to claim 21, wherein the or each said plenum chamber is in a housing into which said bed material is or can extend.

23. A fluid bed furnace, according to claim 22, wherein the or each said plenum chamber is lined with refractory material.

24. A fluid bed furnace, according to claim 23, wherein the or each said plenum chamber houses a gas heating auxiliary burner.

25. A fluid bed furnace, according to claim 24, wherein each said gas feeding duct has its end distal from its said plenum chamber tapered to assist penetration of bed material on expansion.

26. A fluid bed furnace, according to claim 25, wherein each said tapered end has a removable plug therein.

* * * * *